Feb. 2, 1954   I. R. LENTZ ET AL   2,667,660
POULTRY PICKING SHACKLE
Filed May 5, 1951

IRVIN R. LENTZ
DELOS B. VAN DOLAH
*INVENTORS*

BY R. L. Story

ATTORNEY

Patented Feb. 2, 1954

2,667,660

UNITED STATES PATENT OFFICE 2,667,660

POULTRY PICKING SHACKLE

Irvin R. Lentz and Delos B. Van Dolah, Chicago, Ill., assignors to Swift & Company, Chicago, Ill., a corporation of Illinois Application May 5, 1951, Serial No. 224,800

2 Claims. (Cl. 17—44.1)

The present invention relates to an apparatus for use in poultry processing.

In the processing of substantial quantities of poultry shackles are used to support the birds during the scalding and picking operations. Probably the most common practice is to grip the birds' legs in shackles with the remainder of the birds hanging downwardly therefrom. However, by this method, the picking is not performed evenly on all portions of the poultry, the backs of the wings and the upper portion of the backs of the body being inadequately picked.

Various expedients have been tried such as hanging the birds first by the legs and then by the necks. This will do an adequate job but is time consuming and thus increases processing costs. Other methods that have been tried involve substantially increased equipment cost.

We have devised a poultry shackle by which the birds may be suspended with either the legs or the feet uppermost. One advantage of the device is that by a simple, quickly-performed movement the leg-supported birds may be inverted so that the head is supporting the substantial portion of the weight of the bird to hold the bird in a head-up vertical position for the efficient picking of the backs of the wings and bodies of the birds. The time involved in making this change in position is substantially less than that required to release the legs of the bird from the shackle, invert the bird and secure the bird's neck in the grip of the shackle.

A principal object of the invention is to prevent the unnecessary destruction of the picking fingers by beating against the head hook when it is not in use. This is avoided by the teeter-bar structure we have devised. Through the use of this structure, the weight of the bird hanging only by the legs thereof raises the head hook out of the range of the fingers.

Another important object that is achieved by the teeter-bar structure that we have devised is to properly position the bird for most effective picking when it is held in the head-up position. When the majority of the weight of the bird is hanging from the head hook, that weight pulls the head hook down so that the picking fingers will reach well up onto the neck of the bird, while at the same time raising the legs of the bird so as to bring the body thereof into about a vertical position.

Figure 1:
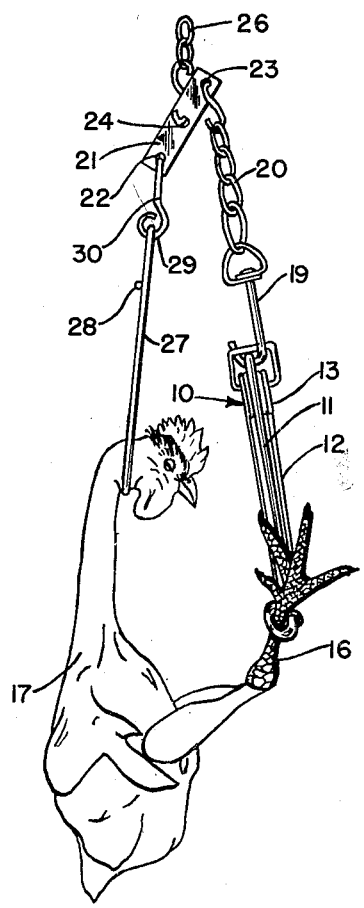
Figure 2:
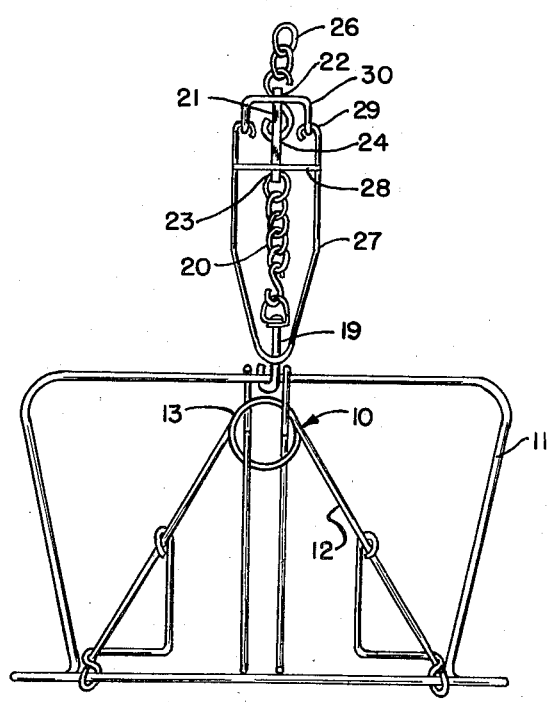

Additional objects and advantages will become apparent from the following description taken in conjunction with the drawings, in which:

Fig. 1 is a side elevation of an embodiment of the present invention with a bird hanging therein, and Fig. 2 is a front elevation of the embodiment of Fig. 1 as it appears without the bird therein.

The illustrated embodiment includes a gripping means, generally 10, which may be a foot shackle of the type illustrated and described in U. S. Patent No. 2,035,948 to De Vout, patented March 31, 1936, the disclosure of which patent is included herein by reference.

The gripping means 10 includes a frame 11 and a pair of arms 12. The arms 12 are formed from a single piece of spring steel which is coiled at the center to form a spring 13 urging the two arms 12 apart. Frame 11 forms a pair of spaced sides against which the arms 12 are urged by spring 13 so that when the legs 16 of the birds 17 are inserted between the sides of the frame 11 and the arms 12, the two will cooperate to grip and hold the legs of the birds.

A rotatable hook 19 and a chain 20 support the gripping means 10 from a teeter bar 21. The teeter bar 21 has holes 22 and 23 adjacent either end thereof and an intermediate opening 24. The end link of chain 20 is looped through the hole 23 at one end of the teeter bar. A supporting chain 26 is secured through intermediate opening 24 in teeter bar 21.

Head hook 27 is V-shaped, with an upper crossbar 28. The upper end of the hook has a pair of loops 29 by which the hook is secured to teeter bar 21 by means of a link 30. A center portion of the link passes through opening 22 and the end of teeter bar 21, and the two ends of the link are secured to loops 29.

The shackle is used by first securing the legs 16 of the bird 17 in the gripping means 10. Chain 26 supports the shackle from an overhead conveyor which moves the bird through a suitable mechanical feather-picking mechanism. The feet of the bird hanging from gripping means 10 reverse the position of the teeter bar 21 from that illustrated in Fig. 1, causing the end of the teeter bar 21 adjacent opening 23 to be in a downward position with the end of the teeter bar to which the head hook 27 is secured being pulled upwardly, thus raising the head hook 27 out of the reach of the mechanism of the picking machine.

After the bird has been through the picking machine, the head of the bird is looped through the head hook 27 as illustrated in Fig. 1. The head is raised sufficiently so that the majority of the weight of the bird is hanging from hook 27. This reverses the position of the teeter bar 21, raising the gripping means 10 and the legs 16 of the bird to a position at substantially right angles to the body of the bird. Because of the fact that the bird hangs primarily by the head hook with the legs in a raised position, the back of the bird is in a substantially vertical position as illustrated, which position enables the rubber fingers of the mechanical picking machines to do an excellent job of picking the feathers between the wings and across the upper portion of the backs, an area which is normally poorly cleaned by machine with the present methods and apparatus for picking poultry.

The foregoing description of a specific embodiment is for the purpose of complying with 35 U. S. C. 112, and we do not desire to be limited to the exact details shown and described, for obvious modifications will occur to a person skilled in the art.

We claim:

1. A poultry shackle including a teeter bar, support means attached to the teeter bar at a point between the ends thereof, a head hook connected to said teeter bar between said point and one end of said teeter bar, said head hook being substantially vertically suspended from said teeter bar, and a gripping means including a leg engaging portion connected to said teeter bar between said point and the other end of the teeter bar, said gripping means being substantially vertically suspended from said teeter bar, said leg engaging portion being located a substantially greater distance below said support means than said head hook.

2. A poultry shackle including a teeter bar, support means attached to the teeter bar at a point between the ends thereof, a head hook linked to said teeter bar between said point and one end of said teeter bar whereby said head hook hangs substantially vertically from said teeter bar, and a gripping means including a leg engaging portion linked to said teeter bar between said point and the other end of the teeter bar whereby said gripping means hangs substantially vertically from said teeter bar, said leg engaging portion being located a substantially greater distance below said support means than said head hook.

IRVIN R. LENTZ.
DELOS B. VAN DOLAH.

References Cited in the file of this patent
UNITED STATES PATENTS

| Number | Name | Date |
|---|---|---|
| 458,018 | Curtis | Aug. 18, 1891 |
| 1,323,071 | Krieger | Nov. 25, 1919 |
| 1,530,675 | Janes | Mar. 24, 1925 |
| 2,405,638 | Bilek | Aug. 13, 1946 |
| 2,412,338 | Jasper | Dec. 10, 1946 |
| 2,423,560 | Jasper | July 8, 1947 |
| 2,469,953 | Davis | May 10, 1949 |
| 2,523,302 | Hunt | Sept. 26, 1950 |
| 2,557,707 | Utter | June 19, 1951 |